US011994105B2

(12) United States Patent
Vasudevan et al.

(10) Patent No.: US 11,994,105 B2
(45) Date of Patent: May 28, 2024

(54) METHOD OF SHUTTING DOWN A WIND TURBINE

(71) Applicant: VESTAS WIND SYSTEMS A/S, Aarhus N (DK)

(72) Inventors: Karthik Vasudevan, Viby J (DK); Ian Couchman, Horley (GB)

(73) Assignee: VESTAS WIND SYSTEMS A/S, Aarhus N (DK)

(*) Notice: Subject to any disclaimer, the term of this patent is extended or adjusted under 35 U.S.C. 154(b) by 180 days.

(21) Appl. No.: 17/623,047

(22) PCT Filed: Jun. 18, 2020

(86) PCT No.: PCT/DK2020/050177
§ 371 (c)(1),
(2) Date: Dec. 27, 2021

(87) PCT Pub. No.: WO2020/259772
PCT Pub. Date: Dec. 30, 2020

(65) Prior Publication Data
US 2022/0228556 A1 Jul. 21, 2022

(30) Foreign Application Priority Data
Jun. 24, 2019 (DK) .......................... PA 2019 70398

(51) Int. Cl.
F03D 7/02 (2006.01)
H02P 9/08 (2006.01)
H02P 101/15 (2016.01)

(52) U.S. Cl.
CPC ......... F03D 7/0264 (2013.01); F03D 7/0224 (2013.01); F03D 7/0252 (2013.01);
(Continued)

(58) Field of Classification Search
CPC .... F03D 7/0264; F03D 7/0224; F03D 7/0252; F03D 7/028; F03D 7/0272; H02P 9/08;
(Continued)

(56) References Cited

U.S. PATENT DOCUMENTS 8,890,349 B1 11/2014 Lynch et al.
2010/0068057 A1 3/2010 Friedrich et al.
(Continued)

FOREIGN PATENT DOCUMENTS

| CN | 107605661 A | 1/2018 |
| CN | 108204336 A | 6/2018 |
| WO | 2020259772 A1 | 12/2020 |

OTHER PUBLICATIONS

PCT, Notification of Transmittal of The International Search Report and The Written Opinion of The International Searching Authority, or The Declaration for Application PCT/DK2020/050177 dated Sep. 10, 2020.
(Continued)

Primary Examiner — Joseph Ortega
(74) Attorney, Agent, or Firm — Patterson + Sheridan, LLP

(57) ABSTRACT

The invention provides a method of shutting down a wind turbine, the wind turbine comprising a rotor with a plurality of blades; and a generator system coupled to the rotor. The method comprises: operating the generator system to generate electrical power and apply a load torque to the rotor; controlling the electrical power generated with a power reference signal; determining that a shutdown of the wind turbine is required; in response to the determination that a shutdown of the wind turbine is required, changing the power reference signal so as to increase the electrical power generated thereby slowing the rotor; determining that a speed of the rotor has reduced below a threshold; and in response to the determination that the speed of the rotor has
(Continued)

decreased below the threshold, changing a pitch of the blades to further slow the rotor.

18 Claims, 3 Drawing Sheets

(52) U.S. Cl.
CPC ............... *F03D 7/028* (2013.01); *H02P 9/08* (2013.01); *F05B 2260/70* (2013.01); *F05B 2270/1032* (2013.01); *F05B 2270/1033* (2013.01); *F05B 2270/321* (2013.01); *F05B 2270/327* (2013.01); *F05B 2270/329* (2013.01); *F05B 2270/335* (2013.01); *H02P 2101/15* (2015.01)

(58) Field of Classification Search
CPC ............. H02P 2101/15; F05B 2260/70; F05B 2270/1032; F05B 2270/1033; F05B 2270/321; F05B 2270/327; F05B 2270/329; F05B 2270/335; F05B 2260/90; F05B 2270/328; Y02E 10/72
See application file for complete search history.

(56) References Cited

U.S. PATENT DOCUMENTS

| | | | |
|---|---|---|---|
| 2014/0225369 A1* | 8/2014 | Bodewes | H02P 9/00 290/44 |
| 2015/0361957 A1 | 12/2015 | Agarwal et al. | |
| 2015/0377215 A1* | 12/2015 | Agarwal | F03D 7/0212 700/287 |
| 2018/0051675 A1 | 2/2018 | Kjær et al. | |

OTHER PUBLICATIONS

Danish Patent and Trademark Office for the 1st Technical Examination Report including the Search Report for Application PA 2019 70398 dated Feb. 18, 2020.

* cited by examiner

METHOD OF SHUTTING DOWN A WIND TURBINE

FIELD OF THE INVENTION

The present invention relates generally to a method of shutting down a wind turbine.

BACKGROUND OF THE INVENTION

Conventionally, in the event of an emergency, such as a high yaw error, a wind turbine is shut down by pitching out the wind turbine blades against the wind so as to immediately slow the rotor.

Such a method can result in large asymmetric loads being experienced by the blades.

Accordingly, there is a need for a method of shutting down a wind turbine that avoids or mitigates such loads.

SUMMARY OF THE INVENTION

A first aspect of the invention provides a method of shutting down a wind turbine, the wind turbine comprising a rotor with a plurality of blades; and a generator system coupled to the rotor. The method comprises: operating the generator system to generate electrical power and apply a load torque to the rotor; controlling the electrical power generated with a power reference signal; determining that a shutdown of the wind turbine is required; in response to the determination that a shutdown of the wind turbine is required, changing the power reference signal so as to increase the electrical power generated thereby slowing the rotor; determining that a speed of the rotor has reduced below a threshold; and in response to the determination that the speed of the rotor has decreased below the threshold, changing a pitch of the blades to further slow the rotor.

Controlling the electrical power generated indirectly controls the load torque applied to the wind turbine because there is a relationship between the generated electrical power and the load torque applied by the generator. The threshold may be a predetermined threshold.

The generator system may comprise a generator and an electrical converter; the electrical power and load torque being produced by the generator; the electrical converter converting a frequency of the electrical power to generate a grid signal which is input to a grid; and the power reference signal controlling the electrical converter which in turn controls the electrical power and load torque produced by the generator.

The pitch of the blades may be kept substantially constant until the speed of the rotor has reduced below the threshold.

The pitch of the blades may be kept substantially constant as the power reference signal changes in response to the determination that the shutdown of the wind turbine is required.

The pitch of the blades may be kept substantially constant from the time of determination that the shutdown of the wind turbine is required until the speed of the rotor has reduced below the threshold.

The term "substantially constant" as used above may mean that the pitch changes by no more than a small amount, for example 2°, 5° or 10°.

The power reference signal may be changed by an amount which is determined, at least in part, in accordance with a load torque limit so that the load torque applied to the rotor does not exceed the load torque limit.

The power reference signal may be changed after determining that the speed of the rotor has reduced below the threshold, so as to decrease the electrical power generated. For instance the power reference signal may be reduced to cause the electrical power to reduce to zero.

Determining that a shutdown is required may comprise identifying an error condition. The error condition may be a yaw error condition. The threshold may be determined based on the error condition. In other words, the threshold may be set based on what is causing the shutdown to take place.

The threshold may be a percentage of an initial speed, for instance a speed of the rotor at the time of changing the power reference signal. Alternatively, the threshold may be an absolute speed.

Changing the pitch of the blades may slow the rotor to a stop. Alternatively, changing the pitch of the blades may slow the rotor to an idling speed.

The changing of the pitch of the blades to further slow the rotor may change the pitch by more than 30°, more than 50° or more than 70°.

A further aspect of the invention provides a wind turbine comprising: a rotor with a plurality of blades; a generator system coupled to the rotor; and a control system, wherein the control system is configured to: operate the generator system to generate electrical power and apply a load torque to the rotor; control the electrical power generated and the load torque with a power reference signal; determine that a shutdown of the wind turbine is required; in response to the determination that a shutdown of the wind turbine is required, change the power reference signal so as to increase the electrical power generated and the load torque, the increased load torque slowing the rotor; determine that a speed of the rotor has reduced below a threshold; and in response to the determination that the speed of the rotor has decreased below the threshold, change a pitch of the blades to further slow the rotor.

The control system may be further configured to: after the power reference signal has been changed, determine that a maximum time has been exceeded (for example the maximum time being measured relative to the time that the power reference signal has been changed, or relative to the time of determination that a shutdown of the wind turbine is required); and in response to the determination that the maximum time has been exceeded, change a pitch of the blades to slow the rotor.

The control system may be further configured to: monitor the speed of the rotor after the power reference signal has been changed to identify an abnormal behaviour (for instance the speed is increasing rather than decreasing); and in response to an identification of abnormal behaviour, change the pitch of the blades to slow the rotor.

A further aspect of the invention provides a computer-readable storage medium having computer-readable program code embodied therewith, the computer-readable program code executable by one or more computer processors to perform an operation for a wind turbine, the wind turbine comprising a rotor with a plurality of blades; and a generator system coupled to the rotor, wherein the operation comprises: operating the generator system to generate electrical power and apply a load torque to a rotor; controlling the electrical power generated and the load torque with a power reference signal; determining that a shutdown of the wind turbine is required; in response to the determination that a shutdown of the wind turbine is required, changing the power reference signal so as to increase the electrical power generated and the load torque, the increased load torque slowing the rotor; determining that a speed of the rotor has reduced below a threshold; and in response to the determination that the speed of the rotor has decreased below the threshold, changing a pitch of the blades to further slow the rotor.

A further aspect of the invention provides a method of shutting down a wind turbine, the wind turbine comprising a rotor with a plurality of blades; and a generator system coupled to the rotor, the method comprising: operating the generator system to generate electrical power and apply a load torque to the rotor; controlling the electrical power generated with a power reference signal; determining that a shutdown of the wind turbine is required; in response to the determination that a shutdown of the wind turbine is required, changing the power reference signal so as to increase the electrical power generated; and after the power reference signal has been changed, determining that a maximum time has been exceeded; and in response to the determination that the maximum time has been exceeded, changing a pitch of the blades to slow the rotor.

A further aspect of the invention provides a method of shutting down a wind turbine, the wind turbine comprising a rotor with a plurality of blades; and a generator system coupled to the rotor, the method comprising: operating the generator system to generate electrical power and apply a load torque to the rotor; controlling the electrical power generated with a power reference signal; determining that a shutdown of the wind turbine is required; in response to the determination that a shutdown of the wind turbine is required, changing the power reference signal so as to increase the electrical power generated; monitoring the speed of the rotor after the power reference signal has been changed to identify an abnormal behaviour; and in response to an identification of abnormal behaviour, changing the pitch of the blades to slow the rotor.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
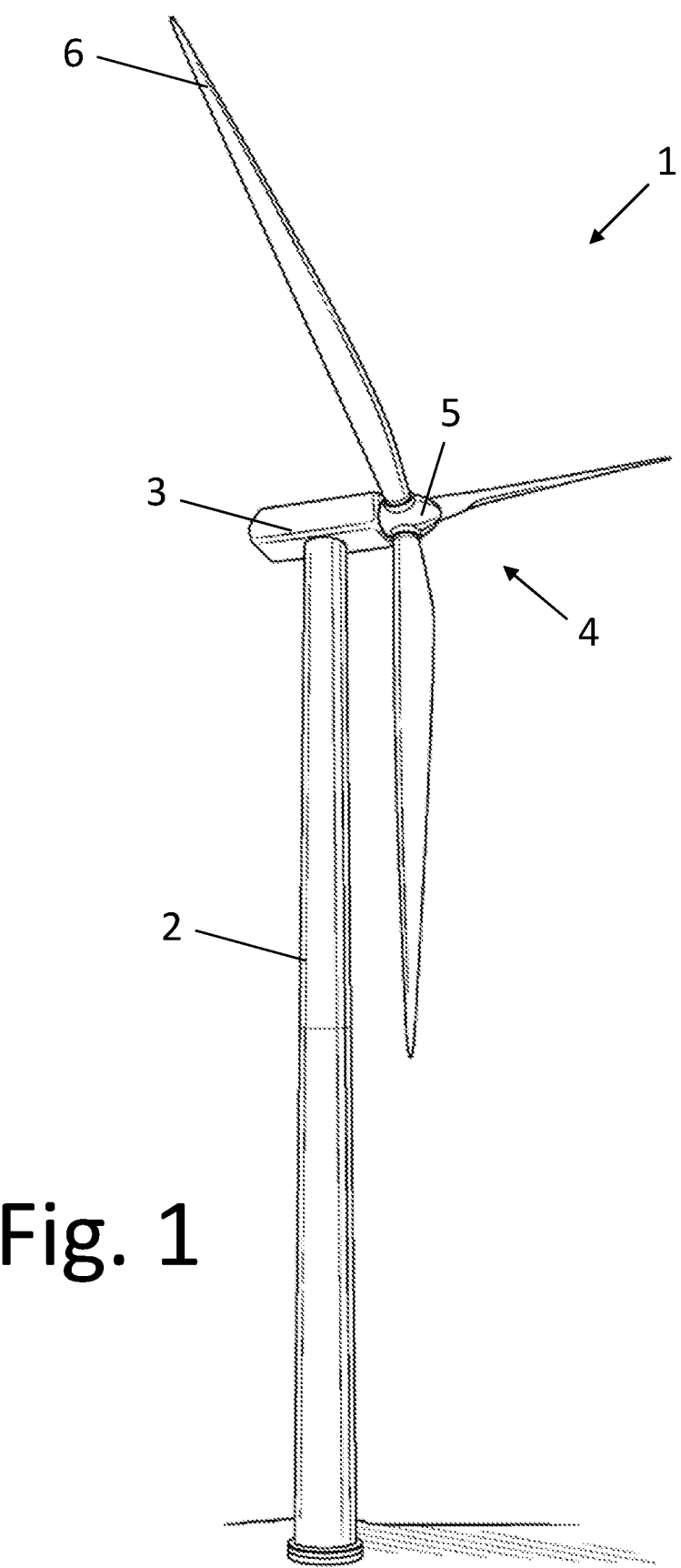
FIG. 1 is a schematic representation of a wind turbine.

FIG. 1 illustrates, in a schematic perspective view, an example of a wind turbine 1. The wind turbine 1 includes a tower 2, a nacelle 3 at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 includes a central hub 5 and a plurality of blades 6 that project outwardly from the central hub 5. In the illustrated embodiment, the rotor 4 includes three blades 6, but the number may vary, for example the rotor may have two or four blades. Moreover, the wind turbine comprises a control system. The control system may be placed inside the nacelle or distributed at a number of locations inside the turbine and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
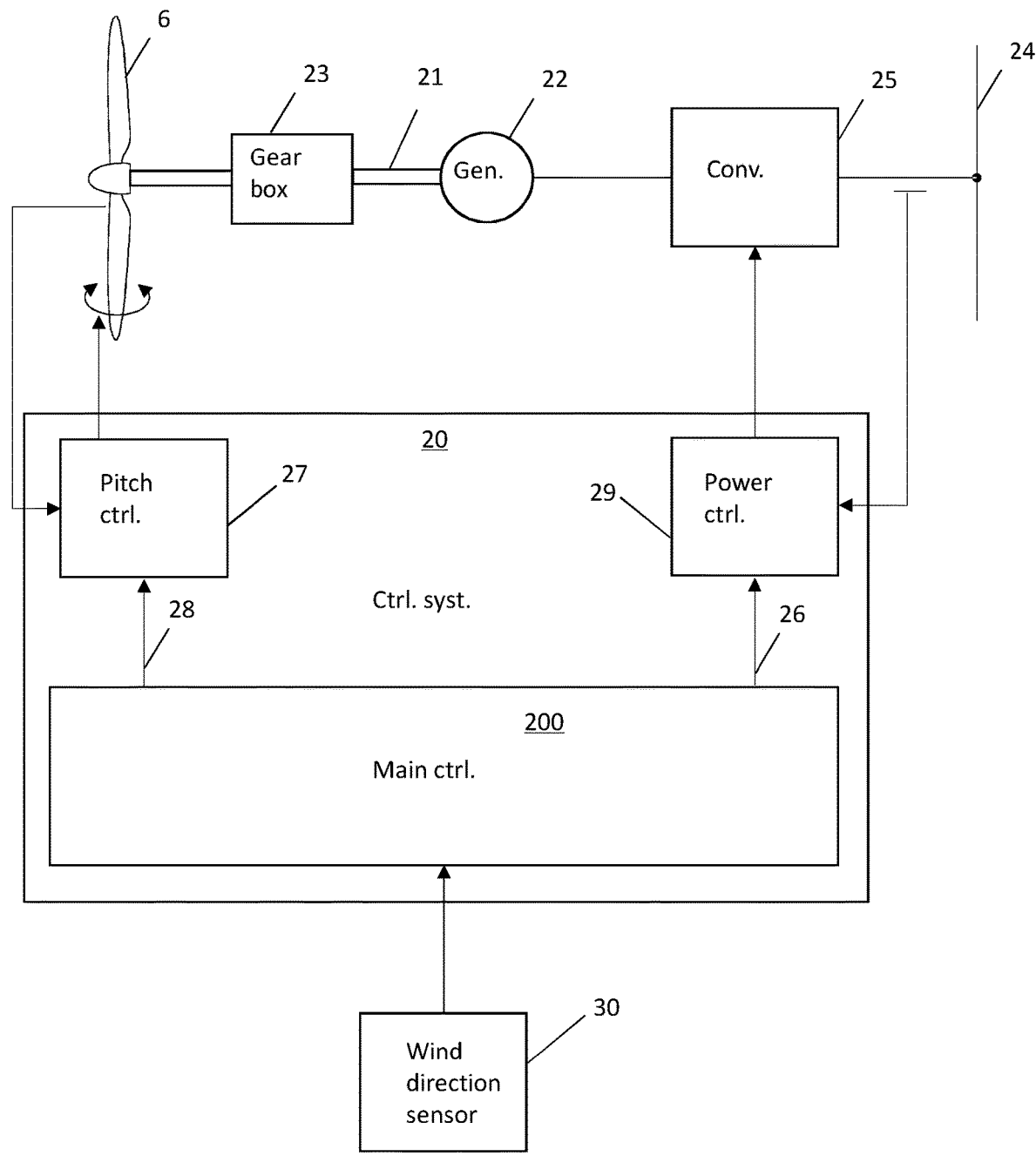
FIG. 2 is a schematic representation of a control system of the wind turbine.

FIG. 2 schematically illustrates an embodiment of a control system 20 together with elements of the wind turbine. The rotor blades 6 are mechanically connected to an electrical generator 22 via a gearbox 23 with an input shaft and an output shaft 21. In direct drive systems, and other systems, the gearbox 23 may not be present. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system 20 comprises a number of elements, including at least one main controller 200 with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter 25. To this end, the control system comprises a pitch system including a pitch controller 27 using a pitch reference signal 28, and a power system including a power controller 29 using a power reference signal 26. The power controller 29 controls the various electric components of the generator converter system in order to deliver the requested power, which in turn controls the torque of the generator 22 that is needed to extract the requested power by the rotor from the wind.

The torque of the generator 22 (referred to below as the generator torque) is applied to the output shaft 21 of the gearbox 23.

The rotor blades 6 can be pitched by a pitch control mechanism. The rotor may comprise a common pitch system which adjusts all pitch angles on all rotor blades at the same time, as well as in addition an individual pitch system which is capable of individual pitching the rotor blades. The control system 20, or elements of the control system 20, may be placed in a power plant controller (not shown) so that the turbine may be operated based on externally provided instructions. In embodiments of the present invention the pitch is controlled based on a common pitch reference onto which the individual pitch reference is superimposed. In embodiments, the slowing of the rotor may be obtained by changing the common pitch reference. Also keeping the pitch of the blades constant may amount to keeping the common pitch reference constant To ensure that the power reference signal 26 does not damage the power controller 29 or the converter 25, the size of the power reference signal 26 is limited so that it cannot exceed a predetermined maximum value, such as a maximum voltage value.

The rotor 4 experiences aerodynamic torque and load torque that act in opposite directions. The aerodynamic torque is the result of wind acting on the rotor blades 6. Changing the pitch of the blades changes the aerodynamic torque, by varying the angle of attack and thus changing the aerodynamic lift. The load torque acts on the rotor against the aerodynamic torque. The load torque has a component which originates from the generator torque applied to the output shaft 21 of the gearbox, and a component caused by friction in the gearbox 23 and bearings.

The difference between the aerodynamic torque and the load torque is the net torque applied to the rotor. If the net torque is zero, i.e. the aerodynamic and load torques are equal, then the speed of the rotor will not change. If the aerodynamic torque is greater than the load torque, the rotor will speed up. If the load torque is greater than the aerodynamic torque, the rotor will slow down.

As explained above, the generator torque produces most of the load torque applied to the rotor. Hence, requesting more power from the generator 22 results in a greater load torque being experienced by the rotor 4. The relationship between torque and power is: P=ω×T, where P is power generated, T is the load torque and ω is the rotational speed of the rotor.

During normal operation of the wind turbine, the speed of the rotor is controlled using the pitch angle of the blades and/or the load torque, which are controlled by the pitch reference signal 28 and the power reference signal 26 respectively.

In a low wind speed operating region, the pitch reference signal 28 may be held constant, and the power reference signal 26 and rotor speed increased as the wind speed increases. In a high wind operation region, the power reference signal 26 and rotor speed may be held constant (at a rated power and a rated speed respectively), and the pitch reference signal 28 adjusted to respond to the wind speed changing.

In an emergency situation, the wind turbine may be conventionally shut down by pitching out the blades. However, pitching out the blades results in a large variation in the distribution of load experienced across the surface of the blade. This is because different portions along the length of the blade experience different lift coefficient profiles as the blade completes a revolution. When the angle of attack is changed during a pitching action, the lift coefficient profile for each portion of the blade changes differently, meaning that across the whole of the surface of the blade, the change in lift coefficient experienced is not uniform. Therefore, a large variation in the distribution of load across the surface of the blade may be experienced. This is undesirable because it may cause damage or fatigue to various parts of the wind turbine such as bearings etc.

The invention avoids or mitigates these problems by determining that a shutdown of the wind turbine is required: then in response to the determination that a shutdown of the wind turbine is required, changing the power reference signal 26 so as to increase the electrical power generated thereby slowing the rotor; determining that a speed of the rotor has reduced below a speed threshold; and in response to the determination that the speed of the rotor has decreased below the threshold, changing a pitch of the blades (by increasing the pitch reference signal 28) to further slow the rotor.

The increase in the power reference signal decreases the rotor speed using the principles described above, i.e. increasing the generated power which in turn increases the load torque applied to the rotor. The aerodynamic torque does not change because the wind speed does not vary much, and the blade pitch does not change. Therefore, the net torque causes the rotor to slow down.

A wind direction sensor 30 (such as a wind vane) may be used to determine that a shutdown of the wind turbine is required due to a high yaw error. The wind direction sensor 30 determines the angle of the wind relative to the nacelle. If the magnitude of the angle increases above a threshold angle, then it is determined that there is a high yaw error which triggers a shutdown.

Other possible reasons for determining that a shutdown of the wind turbine is required include: extreme wind events; failure of a sensor, actuator or component; or loss of connection to the grid.

Figure 3:
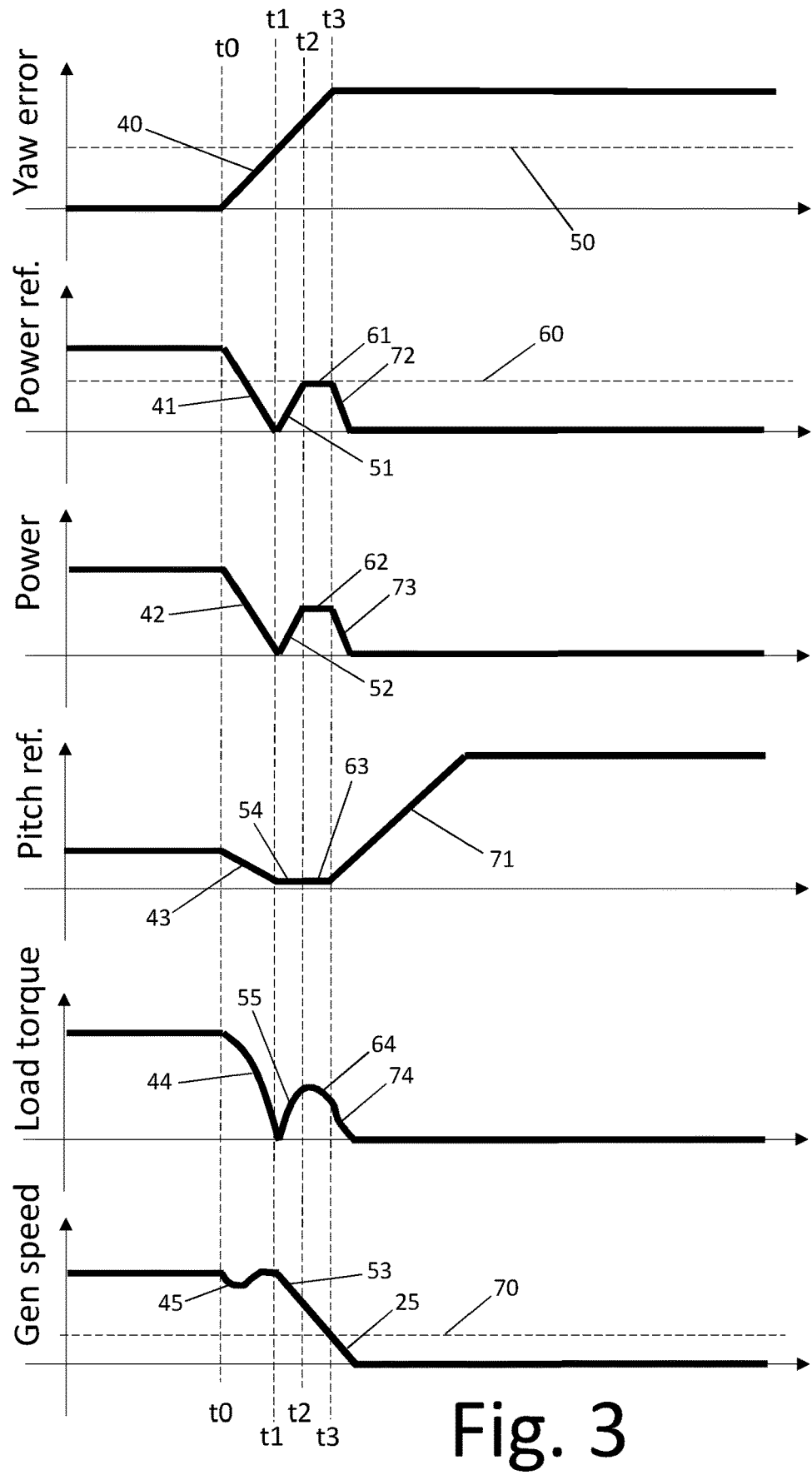
FIG. 3 illustrates various turbine parameters during a shutdown.

FIG. 3 illustrates this technique, showing an example of system parameters when the invention is employed.

Normal operation of the wind turbine takes place until time t0. During this normal operation period before time t0, the electrical power generated is controlled as described above using the power reference signal 26 and/or the pitch reference signal 28.

At time t0, a condition changes. For example, this condition may be that the wind direction changes so that the wind is no longer aligned with the rotor, and instead the wind is coming into the turbine sideways. Thus, at time t0 the yaw error signal begins to increase as shown at 40.

As the yaw error increases, the power reference signal 26, power, pitch reference signal 28 and load torque all decrease as shown at 41, 42, 43 and 44 respectively. The generator speed dips and then recovers as shown at 45.

At time t1, a determination is made by the controller 200 that a shutdown of the wind turbine is required, since the yaw error signal has crossed a threshold 50. In response to the determination that a shutdown of the wind turbine is required, the power reference signal 26 is increased (as shown at 51) so as to increase the electrical power generated (as shown at 52). The wind speed does not vary much, and the pitch of the blades does not change (as shown at 54 by the constant pitch reference signal), so the aerodynamic torque does not change. The increased power requirement causes the load torque to increase (as shown at 55). Since the aerodynamic torque has not changed, there is now a net torque being applied which causes the rotor to slow (as shown at 53).

The power reference signal 26 is increased until it reaches a power offset level 60 at time t2. The power offset level 60 may be determined in a variety of ways.

In one example the power reference signal 26 may be changed by a fixed and predetermined amount (for instance 1 MW).

In another example the power reference signal 26 may be changed by a fixed percentage (for instance 50%, 100% or 200%).

In other examples, the power reference signal 26 may be changed by an amount which is determined on the basis of a variety of parameters such as load torque, blade pitch and power.

Optionally the power reference signal 26 may be changed by an amount which is determined, at least in part, in accordance with a load torque limit so that the load torque applied to the rotor does not exceed the load torque limit as the speed gets low (torque=power/speed). So for example if increasing the power reference signal 26 by 1 MW would cause the load torque to exceed the load torque limit, then the power reference signal 26 is increased by a smaller amount which keeps the load torque below the load torque limit.

Optionally the power reference signal 26 may be changed by a proportional-integral (PI) controller trying to reach a reference speed (for instance the speed threshold 70 mentioned below) using power with a load torque limit and relevant integrator wind up protection.

Alternatively the controller 200 may look at generator speed, tower oscillations, blade loads etc. and control the power reference signal 26 accordingly.

Between time t2 and time t3, the power reference signal 26 is held constant (as shown at 61) so the power is also held constant (as shown at 62). Since the pitch reference signal 28 is also held constant during this phase (as shown at 63) the load torque starts to reduce slightly (as shown at 64).

At time t3, the controller 200 determines that the speed of the rotor has reduced below a speed threshold 70. This determination may be made by monitoring the speed of the rotor or the generator with one or more sensors.

The determination that the speed of the rotor 4 has reduced below the speed threshold 70 triggers the pitch reference signal to be increased (as shown by ramp 71) so that the pitch of the blades is increased until it reaches 90°. This reduces the aerodynamic torque so as to further slow the rotor as shown at 72. In this case the rotor is slowed to a complete stop. In other cases, the rotor may be slowed down to an idling speed.

The speed threshold 70 may be a percentage of an initial speed of the rotor at time t1, or it may be an absolute value. The threshold speed 70 may be predetermined or it may be determined by the controller 200 during the aforementioned shutdown process.

Note that the pitch reference signal 28 is illustrated as constant between time t1 and t3. Thus, the pitch of the blades is kept substantially constant as the power reference signal 26 changes between time t1 and time t2, and it is also kept substantially constant from the time of determination that the shutdown of the wind turbine is required (time t1) until the speed of the rotor has reduced below the threshold (time t3).

Note however that the individual pitch signals for each blade may vary slightly (for instance by a few degrees) during this time period between time t1 and time t3, whereas the collective pitch angle may vary by a smaller amount. The change of pitch angle caused by the ramp 71 on the other hand is much greater (for instance it may be more than 40° or more than 60°). Thus, the term "substantially constant" as used above may mean that the pitch changes by no more than a small amount, for example 2C, 5° or 10°.

At time t3, the power reference signal 26 and power are reduced (as shown at 72, 73 respectively) and the load torque reduces (as shown at 74). As the generator speed decreases, the generator is unable to generate as much power due to the P=ω×T relationship.

As the power reference signal 26 starts to increase at time t1, the speed should decrease fairly rapidly (as shown at 53). If the speed does not reduce as expected, then it may be desirable to change the pitch of the blades to shut down the rotor even if the speed has not reduced below the speed threshold 70. This may be dealt with in a number of ways.

In a first example, the controller 200 may be configured to determine that a maximum time has been exceeded; and in response to the determination that the maximum time has been exceeded, change a pitch of the blades to slow the rotor. For example the maximum time may be measured relative to the time t1 that the power reference signal has been increased, which in this case is also the time t1 of determination that a shutdown of the wind turbine is required.

In a second example, the controller 200 may be configured to monitor the speed of the rotor after the power reference signal 26 has been increased at time t1, to identify an abnormal behaviour. For instance the speed may be increasing rather than decreasing. In response to an identification of such abnormal behaviour, the pitch of the blades may be changed immediately to slow the rotor, rather than waiting for the speed to drop below the speed threshold 70.

The procedure described above has the advantage of limiting the mechanical forces acting on the wind turbine. After the power reference signal has been increased at t1, the absolute values of both the tilt moment and the yaw moment on the main bearing decrease significantly, reducing the mechanical loads on the wind turbine.

Other benefits include: reducing the negative thrust peak leading to lower tower loads and lower negative blade flap loads; and a reduction of the required maximum pitch rate (i.e. the rate of change of pitch angle caused by the ramp 71) leading to lower loads on the pitch control system.

Although the invention has been described above with reference to one or more preferred embodiments, it will be appreciated that various changes or modifications may be made without departing from the scope of the invention as defined in the appended claims.

The invention claimed is:

1. A method of shutting down a wind turbine, the wind turbine comprising a rotor with a plurality of blades and a generator system coupled to the rotor, the method comprising:

operating the generator system to generate electrical power and apply a load torque to the rotor;

controlling the electrical power generated with a power reference signal;

determining that a shutdown of the wind turbine is required;

in response to determining that the shutdown of the wind turbine is required, changing the power reference signal so as to increase the electrical power generated thereby slowing the rotor, wherein a pitch of the plurality of blades is kept substantially constant as the power reference signal changes;

determining that a speed of the rotor has reduced below a threshold; and in response to determining that the speed of the rotor has decreased below the threshold, changing the pitch of the plurality of blades to further slow the rotor.

2. The method of claim 1, wherein the pitch of the plurality of blades is kept substantially constant from a time of determining that the shutdown of the wind turbine is required until the speed of the rotor has reduced below the threshold.

3. The method of claim 1, wherein determining that the shutdown is required comprises identifying an error condition.

4. The method of claim 3, wherein the error condition is a yaw error condition.

5. The method of claim 3, wherein the threshold is determined based on the error condition.

6. The method of claim 1, wherein the threshold is a percentage of an initial speed of the rotor.

7. The method of claim 1, wherein the threshold is an absolute speed.

8. The method of claim 1, wherein changing the pitch of the blades slows the rotor to a stop.

9. The method of claim 1, wherein the power reference signal is changed by an amount which is determined, at least in part, in accordance with a load torque limit so that the load torque applied to the rotor does not exceed the load torque limit.

10. The method of claim 1, further comprising changing the power reference signal after determining that the speed of the rotor has reduced below the threshold, so as to decrease the electrical power generated.

11. A wind turbine comprising:

a rotor with a plurality of blades;

a generator system coupled to the rotor; and a control system, wherein the control system is configured to:

operate the generator system to generate electrical power and apply a load torque to the rotor;

control the electrical power generated and the load torque with a power reference signal;

determine that a shutdown of the wind turbine is required;

in response to determining that the shutdown of the wind turbine is required, change the power reference signal so as to increase the electrical power generated and the load torque, the increased load torque slowing the rotor, wherein a pitch of the plurality of blades is kept substantially constant as the power reference signal changes;

determine that a speed of the rotor has reduced below a threshold; and in response to determining that the speed of the rotor has decreased below the threshold, change the pitch of the plurality of blades to further slow the rotor.

12. The wind turbine according to claim 11, wherein the control system is further configured to:
after the power reference signal has been changed, determine that a maximum time has been exceeded; and
in response to determining that the maximum time has been exceeded, change the pitch of the blades to slow the rotor.

13. The wind turbine according to claim 11, wherein the control system is further configured to:
monitor the speed of the rotor after the power reference signal has been changed to identify an abnormal behavior; and
in response to identifying the abnormal behavior, change the pitch of the blades to slow the rotor.

14. A non-transitory computer-readable storage medium having computer-readable program code embodied therewith, the computer-readable program code executable by one or more computer processors to perform an operation for a wind turbine, the wind turbine comprising a rotor with a plurality of blades and a generator system coupled to the rotor, wherein the operation comprises:
operating the generator system to generate electrical power and apply a load torque to a rotor;
controlling the electrical power generated and the load torque with a power reference signal;
determining that a shutdown of the wind turbine is required;
in response to determining that the shutdown of the wind turbine is required, changing the power reference signal so as to increase the electrical power generated and the load torque, the increased load torque slowing the rotor, wherein a pitch of the plurality of blades is kept substantially constant as the power reference signal changes;
determining that a speed of the rotor has reduced below a threshold; and
in response to determining that the speed of the rotor has decreased below the threshold, changing the pitch of the plurality of blades to further slow the rotor.

15. The computer-readable storage medium according to claim 14, wherein the operation is further configured to:
after the power reference signal has been changed, determining that a maximum time has been exceeded; and
in response to determining that the maximum time has been exceeded, changing the pitch of the plurality of blades to slow the rotor.

16. The computer-readable storage medium according to claim 14, wherein the operation further comprises:
monitoring the speed of the rotor after the power reference signal has been changed to identify an abnormal behavior; and
in response to identifying the abnormal behavior, changing the pitch of the plurality of blades to slow the rotor.

17. The computer-readable storage medium according to claim 14, wherein the pitch of the plurality of blades is kept substantially constant from a time of determining that the shutdown of the wind turbine is required until the speed of the rotor has reduced below the threshold.

18. The computer-readable storage medium according to claim 14, wherein determining that a shutdown is required comprises identifying an error condition.

* * * * *